United States Patent [19]
Archer et al.

[11] Patent Number: 5,414,842
[45] Date of Patent: May 9, 1995

[54] EXTERNAL SORTING USING VIRTUAL STORAGE AS A WORK DEVICE

[75] Inventors: Gary D. Archer, Campbell; Douglas R. Case; Hilda J. Wu, both of San Jose, all of Calif.

[73] Assignee: International Business Machines Corporation, Armonk, N.Y.

[21] Appl. No.: 8,048

[22] Filed: Jan. 22, 1993

Related U.S. Application Data

[63] Continuation of Ser. No. 389,243, Aug. 2, 1989, abandoned.

[51] Int. Cl.$^6$ .................................................. G06F 7/06
[52] U.S. Cl. .................................. 395/600; 364/964.2; 364/961.2; 364/243.4; 364/256.3
[58] Field of Search ............... 395/600, 425, 250, 775, 395/800; 364/DIG. I, DIG. II

[56] References Cited

U.S. PATENT DOCUMENTS

| | | | |
|---|---|---|---|
| 3,713,107 | 1/1973 | Barsamian | 364/200 |
| 4,422,145 | 12/1983 | Sacco et al. | 364/200 |
| 4,423,479 | 12/1983 | Hanson et al. | 364/200 |
| 4,873,625 | 10/1989 | Archer | 395/650 |
| 4,962,451 | 10/1990 | Case et al. | 364/900 |
| 5,003,459 | 3/1991 | Ramanujan | 395/400 |
| 5,038,278 | 8/1991 | Steely | 395/475 |

Primary Examiner—David Y. Eng
Attorney, Agent, or Firm—R. Bruce Brodie

[57] ABSTRACT

If a real memory-backed demand paging virtual store is used as a work device in an external sort, then data movements and processing time are substantially less than that for processing the same external sort in either an internal (real) memory or DASD serving as the work device. Also, reblocking of generated partial sort strings during the sort phase and of the totally ordered string during the merge phase is avoided. The optimum ratio of internal (real) memory backing to the virtual store lies between 30-80 percent. Page faulting is reducible as a consequence of the fact that in the external sorting using the virtual store as a work device, a data element need only be referenced twice.

5 Claims, 1 Drawing Sheet

```
GETMAIN size = 32 megabytes      /*Get 32 megabytes of virtual storage

INAREA <- VA1                    /*INAREA points to start of virtual storage

RSAREA <- VA1 + 16M              /*RSAREA points to middle of virtual storage

INAREA ->  ┌──────┐
           │ 16M  │
RSAREA ->  ├──────┤
           │ 16M  │
           └──────┘

I <- 1                           /*Initialize index value to 1

DO NEXT 7 STEPS UNTIL I=13       /*Repeated until all records are processed

START I/O TO INAREA          /*Read records into INAREA

SORT(INAREA)                 /*Sort the records in INAREA

C(RSAREA) <- S(INAREA)       /*Move the records to RSAREA in sorted order

STMAP(I) <- RSAREA           /*Store address of RSAREA to
                                    Storage Map Table GETMAIN size = 16M           /*Get 16M of virtual storage RSAREA <- VA1                /*RSAREA points to start of new
                                    virtual storage I <- I + 1                   /*Increment index by 1

DO I=1,13                        /*Put first record of each
    TREE <- STMAP(I)                string on tree INITIALIZE TREE              /*Initialize tree such that records on
                                    tree are in proper order C(INAREA) <- MERGE using     /*Use Replacement-Selection to merge
               TREE                 records to INAREA WRITE C(INAREA) to OUTPUT    /*Write to output when INAREA full REPEAT R-S MERGE until DONE
```

Illustrative Example of the Method According to the Invention

```
GETMAIN size = 32 megabytes     /*Get 32 megabytes of virtual storage

INAREA <- VA1                   /*INAREA points to start of virtual storage

RSAREA <- VA1 + 16M             /*RSAREA points to middle of virtual storage
```

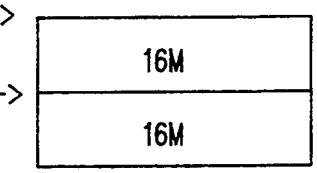

```
I <- 1                          /*Initialize index value to 1

DO NEXT 7 STEPS UNTIL I=13      /*Repeated until all records are processed

START I/O TO INAREA             /*Read records into INAREA

SORT(INAREA)                    /*Sort the records in INAREA

C(RSAREA) <- S(INAREA)          /*Move the records to RSAREA in sorted order

STMAP(I) <- RSAREA              /*Store address of RSAREA to
                                  Storage Map Table GETMAIN size = 16M              /*Get 16M of virtual storage RSAREA <- VA1                   /*RSAREA points to start of new
                                  virtual storage I <- I + 1                      /*Increment index by 1

DO I=1,13                       /*Put first record of each
    TREE <- STMAP(I)              string on tree INITIALIZE TREE             /*Initialize tree such that records on
                                  tree are in proper order C(INAREA) <- MERGE using    /*Use Replacement-Selection to merge
                 TREE             records to INAREA WRITE C(INAREA) to OUTPUT   /*Write to output when INAREA full
REPEAT R-S MERGE until DONE
```

Illustrative Example of the Method According to the Invention

EXTERNAL SORTING USING VIRTUAL STORAGE AS A WORK DEVICE

This application is a continuation of application Ser. No. 07/389,243, filed Aug. 2, 1989, now abandoned.

FIELD OF THE INVENTION

This invention relates to sorting and, more particularly, to sorting in a CPU demand paging virtual storage environment.

DESCRIPTION OF RELATED ART

CPU and Staged Storage

Modern data processing machines comprise an instruction processor coupled to a hierarchically organized and least recently used (LRU) managed staged storage system containing software and data. The fastest, most rapidly accessed memory is positioned closest to the instruction processor. Also, it is placed at the top of the hierarchy. Progressively slower forms of memory, which have the bulk of the information written thereon, occupy the lower positions within the hierarchy. In this specification, the terms "memory" and "storage" are used synonomously.

Because memory costs increase dramatically with speed, many computer systems divide the physical memory subsystem into a number of performance levels. Some of these levels, such as DASD and tape, have been treated as peripheral I/O devices and are accessed over an asynchronous path. Other levels, such as RAM and cache, have been treated directly by system hardware and are accessed over a synchronous path as part of internal memory.

The term "primary storage" or "internal storage" specifies that portion of memory randomly addressable for single read or write transfers. In IBM systems, RAM is byte addressable. "Secondary" or "external storage" refers to that portion of memory/storage that is not randomly addressable and is either directly accessed or must be accessed in fixed-size blocks.

Primary or internal store is termed "synchronous" in that a processor referencing said internal store will idle until a return is received; whereas, if the data being sought resides in external store (beyond a point called the "I/O boundary"), a referencing processor will search for another task to perform instead of waiting. This task or process switching is disruptive in that a retrieval path must be established to the new data and the processing state of the prior task must be saved. When the retrieval from external storage has been completed, it is again necessary to switch the CPU back to the former process or task.

It was desired to minimize the paging or fixed-size block references beyond the I/O boundary to reduce CPU overhead by incorporating additional memory as part of the primary store. The added memory, termed "expanded store", is randomly accessed on a block or page addressable (4096 bytes/block) basis. It is managed as an LRU real memory backed paging store.

Demand Paging Virtual Storage

"Virtual Storage" is the addressing of a storage space much larger than that available in the primary or internal memory of a CPU. It relies on locality of referencing in both space and time. That is, processes tend to reference storage in nonuniform, highly localized patterns. This makes it possible for a small amount of real memory to back a much larger amount of virtual storage. If the referenced data is not available in internal storage, then it is swapped in from secondary storage.

In a virtual demand paging system, each process actively references some subset of its virtual pages. The capacity of the system to manage pages is measured in terms of an upper bound on the number of slots or "page frames". That is, the number of page frames is related to the amount of primary store set aside to support the page frames. If the sum of the subsets of pages referenced by processes exceeds the number of page frames, then faulting will occur. "Faulting" is a synonym for the requirement to access secondary storage since the referenced page was not resident in the LRU-managed primary store. A system in this state is said to be "paging".

Paging and Thrashing

When a CPU runs several processes concurrently (multiprogramming or multitasking), each process may make repeated calls to its "working set" of pages. For a fixed size of internal (real) store, the number of pages per process resident in primary store varies inversely with the number of processes. This makes it impossible for every process to keep sufficient pages in primary store to avoid generating a large number of page faults. Thus, there is a critical relationship between the amount of primary (real) memory and the degree of multiprogramming. This means that beyond a threshold, the path between the secondary and primary stores becomes saturated, many processes await page transfers, and the CPU is underutilized or starved. In this regard, "thrashing" is the term used to connote a high repaging rate and is an index of the tendency of a CPU-based page replacement manager to incorrectly guess the future referencing occurrences in a demand paging virtual store.

Sacco et al, U.S. Pat. No. 4,422,145, "Thrashing Reduction in Demand Accessing of a Data Base Through an LRU Paging Buffer Pool", issued Dec. 20, 1983, gives a description of the interaction among pages, frames, and a high repaging rate in a demand paging virtual system using a "hot set" instead of a "working set" model.

Internal and External Sorting

Traditionally, sort methods are classified into internal methods and external methods. An "internal method" is one that can be applied with acceptable performance only to those lists of data that can be completely contained within the primary storage of the processor. An "external method" is one that reasonably applies to files of data that are too large to fit into the primary store and must therefore rely on external bulk storage devices, such as tape or DASD, during the sorting process.

Most "external sorting" methods make a first pass through the file to be sorted, breaking it up into blocks about the size of internal memory, sorting these blocks using any one of a number of internal sorting methods, and then writing the results to the "work device". A merge is then performed upon the sorted blocks together by making several passes through the file and creating successively larger sorted blocks until the whole file is sorted. Typically, replacement selection is used for the merging of multiple ordered strings into longer strings. This is described by Knuth, "Searching and Sorting", The Art of Computer Programming, Vol. 3, copyright 1973 by Addison-Wesley Publishing Co., pp. 251–266.

Quantitatively in an external sort, if there is an unordered list of n keys and an internal memory capacity of m<n words, then each sort pass produces n/m sorted blocks. If a p-way merge is performed on each subsequent pass, then log(base key)(n/m) passes may be required.

Prior Art External Sorting in Primary Store

Barsamian, U.S. Pat. No. 3,713,107, "Firmware Sort Processor System", issued Jan. 23, 1973, resorts to multiple overlapped processor architecture using main memory as a sort buffer. More particularly, Barsamian uses an external sort processor (30) bus coupled to and overlapped with a host CPU (20) to increase throughput (see col. 3, lines 59–64; col. 19, line 37, to col. 22, line 30; and FIGS. 3 and 5).

Case et al, U.S. Pat. No. 4,962,451, "Cache-Effective Sort String Generation Method", filed Nov. 7, 1985, issued Oct. 9, 1990, teaches the new use of an LRU-managed cache portion of a CPU main memory for performing the internal sort and merger operations of an external sort. This result occurs by constraining the size of each sort and merge subset to be less than that cache size which would trigger the cache LRU paging action.

Sorting in Virtual Storage

Sedgewick, "Algorithms", Second Edition, copyright 1983, 1988 by Addison-Wesley Publishing Co., page 187, points out that "a large virtual memory capability should not be overlooked in a method for sorting very large files". He then teaches away therefrom by pointing out several sort methods which would not succeed in a VM sort environment such as Quicksort and Radix sort.

Lorin "Sorting and Sort Systems" copyright 1975 by Addison-Wesley Publishing Co., pp. 329–347, and especially pp. 334–339 and 343–345, points out that:

". . . the concept of virtual memory suggests that it would be possible to order a larger population of files using strictly internal sort techniques. As the concepts of the transparency of real resource and logical resource advance, it might be possible to conduct all sorting in this way. However, since the behavior of virtual memory overlays varies, the sort technologist must discover what internal sorts are appropriate for ordering of files in virtual memory."

SUMMARY OF THE INVENTION

It is an object of this invention to devise a method for performing expeditious external sorts in a CPU.

It is a related object that said method be performed in a CPU having a demand paging virtual store.

It is yet another object that said external sort be executed in said virtual store with a minimal number of page defaults.

It was unexpectedly observed that if a real memory backed, demand paging virtual store were used as the "work device" during the sort and merge phases of an external sort, then the number and the execution time of data movements per element would be less than that required if either internal memory or DASD served as the work device. Page faulting is reducible as a consequence of the fact that in the external sorting using the virtual store as a work device, a data element need only be referenced twice.

The first reference occurs during a first pass over an unsorted data string where the data is blocked and sorted in VS fully backed by internal (real) memory and then written out to another portion of VS selectively backed by internal (real) memory, i.e., the work device. The second reference occurs when each block of sorted data is read from the "work device" and merged with other sorted blocks during a second pass. The fact that only two references per data element are made on the work device minimizes excessive paging in operating the virtual store. This is because the repaging rate per data element is inherently low.

More particularly, the foregoing objects are satisfied by a new use for an LRU-managed virtual storage (VS) of a CPU in the external sort string generation of m records. In this regard, the CPU includes internal (real) memory for storing programs and data, and means for accessing the internal (real) memory for executing sort and management operations, the internal (real) memory and accessing means being managed as VS. Also, the sort string generation is manifest as a nested ordering of the keys of the records.

The method of the invention comprises the steps of:

(a) during a first pass, calling one of m/s subsets of s keys (s<m) of the records from an extrinsic source into a portion of VS fully backed by internal (real) memory, and arranging the called subset into a partial nested ordering thereof, moving the nested ordering to another portion of VS selectively backed by internal (real) memory and updating a table with the VS address of the nested ordering, the calling, arranging, moving, and updating steps being repeated until the m/s subsets are exhausted; and (b) during a second pass, executing a t-way replacement selection merge (t<s) in VS selectively backed by internal (real) memory from among at least one key selected from each of t partial nested orderings of the subsets resident in the VS according to their table VS addresses until the m/s such orderings become exhausted.

Advantageously, as the ratio or internal/real storage to virtual storage increases, the number of references beyond the I/O boundary decreases. Thus, optimum performance would be expected in systems having expanded store as part of the primary or internal store.

BRIEF DESCRIPTION OF THE DRAWING

The FIGURE sets out a pseudo-code representation of a two-phase external sort method according to the invention using a partitioned real memory backed virtual store as a work device.

DESCRIPTION OF THE PREFERRED EMBODIMENT

The Host CPU Environment for Executing the Method of the Invention

The invention can be conveniently practiced in a general purpose computer such as an IBM/360 or 370 architected CPU having the IBM MVS operating system. An IBM/360 architected CPU is fully described in Amdahl et al., U.S. Pat. No. 3,400,371, "Data Processing System", issued Sep. 3, 1968.

An MVS operating system (OS) is set out in IBM publication GC28-1150, "MVS/Extended Architecture System Programming Library: System Macros and Facilities", Vol. 1. Details of standard MVS or other operating system services such as lock management, subsystem invocation by interrupt or monitor, and the posting and waiting of tasks is omitted. These OS services are believed well appreciated by those skilled in the art.

Illustrative Embodiment and Comparison with Prior Art

Suppose it were desired to sort 200 megabytes (MB) of data on a CPU having 32 MB of internal (real) memory and near infinite DASD, both managed as a demand paging virtual store. It is intended to externally sort the 200 MB file using real memory backed virtual store as a sort work device with and without 256 MB of expanded storage. The first example exercises the method of the invention, while the second example illustrates external sorting according to the prior art.

Referring now to the figure, the size of this virtual storage should be large enough so an efficient internal sorting algorithm can be applied and yet small enough so that it is always backed up by real storage. The following comments should assist in appreciating the control flow set out in the figure.

SORT Phase

Assume that expanded store is not available:

(1) The process starts by ensuring that 32 MB of virtual storage are assigned or reserved using the operator GETMAIN as there exists 32 MB of real storage available.

(2) The virtual storage is partitioned into two equal parts. The first part, INAREA, is used as an input buffer area, while the second part, RSAREA, is used as an output area to store the sorted string.

(3) Records are transferred into INAREA until INAREA is full. They are then sorted using a replacement-selection internal sort algorithm in INAREA. After this, either (a) the records can be moved to RSAREA while sorting (i.e., after the replacement-selection selects a "smallest" record, this record can be moved to RSAREA at that time); or (b) the pointers to records in INAREA are sorted, and then records in INAREA are moved to RSAREA based on the sorted pointers.

(4) Save the address of RSAREA in a Storage Map Table, STGMAP, and page out the contents to secondary storage.

(5) Obtain another segment of virtual storage. The size of this segment is equal to the size of RSAREA, 16 MB in this example, making this area the new RSAREA.

(6) Repeat steps 3–5 until all records in the input file are called, sorted (arranged), moved to internal (real) memory backed VS, swapped out to secondary store, and VS address recorded.

Note that the process of grouping a number of records before writing them to external storage is called "blocking". The blocking process has to be applied to the records in RSAREA before they can be written to external storage. The blocking process involves calculating the block size, the number of records per block, the location of each block, etc. The blocking process also involves the creation of control blocks to pass all the necessary information to a chosen access method. If the records remain in the virtual storage, while they may be paged out, they are already in the required format, so to speak.

Assume that expanded store is available:

(7) Steps (1)–(6) are modified such that as the size of virtual storage GETMAINed and referenced exceeds the size of the real storage, the least recently used virtual storage pages are paged out to expanded storage. Also, the RSAREA with the smallest index (I) number will be paged out to expanded storage. Since there are 256 MB of expanded storage available, no pages will be moved to secondary storage.

MERGE Phase

The file to be sorted was partitioned into 200/16=13 subsets or 13 sorted strings. The size of each string is about 16 MB. Each entry in the Storage Map Table points to the starting VS address of a sorted string.

Using entries in the Storage Map Table to find the first record of each string, the first record of each string is placed on a sort/merge tree. A 13-way replacement/selection merge is then performed using the tree populated with 13 nodes. At this point, records referenced may already be paged out to expanded storage, so they have to be brought into internal (real) storage. INAREA is now used as the output buffer area. When INAREA is full, the data in INAREA will be written to an output file. This process continues until all records are merged to become one output file.

In this invention, virtual storage embraces a sort work data set and is not merely a "sorting area". While using virtual storage as a "sorting area" may avoid data movements to secondary storage, it nevertheless is penalized by the fact that a data reference pattern for typical internal sorting is random and records could potentially be referenced many times. If the amount of virtual storage is too big relative to the amount of real storage available, it is very likely that a record has already been paged out by the time the next reference occurs. This record has to be paged which will cause another record to be paged out. As the system paging rate starts to rise, "thrashing" problems might occur.

A subset of records from each ordered string that had been mapped into virtual storage are merged together. This data may already have been migrated to either expanded storage or to auxiliary storage because there is usually a relatively long period of time between the sort step and the merge step. However, since there are only two references to the data, once when the records are put in order and once when the records are merged, at most two page faults may occur.

A Comparison

Ordinarily, external sorts tend to be I/O bound (i.e., reference to external or secondary storage). This means that most of the elapsed time of an external sort is usually spent waiting for I/O to complete. Less I/O means shorter elapsed time. The method of external sorting in this invention requires minimum I/O activities as compared to the traditional external sorting method, as well as the method of using virtual storage as a "sorting area".

Referring to the table below, there is shown the comparison of I/O activities for each method relative to the amount of real/expanded storage available to back up virtual storage. The numbers shown here are the number of I/O activities required for each record. A "2" means two I/O activities are required for each record. A "1"0 means an average of one I/O activity is required for each record. "Infinite" means that the number of I/O activities required for each record could potentially become infinite.

|  | Using auxiliary as work data set | Using virtual as sorting area | Using virtual as work data set |
| --- | --- | --- | --- |
| 100% of virtual backed by R/E | 2 | 0 | 1 |

| | Using auxiliary as work data set | Using virtual as sorting area | Using virtual as work data set |
|---|---|---|---|
| 50% of virtual backed by R/E | 2 | Infinite | 1 |
| No virtual backed by R/E | 2 | Infinite | 2 |

In considering this invention, it should be remembered that the present disclosure is illustrative only, and the scope of the invention should be determined by the appended claims.

We claim:

1. A new use for an LRU managed virtual store (VS) of a CPU as a work device during the sort and merge phases of an external sort operation on key based records, said VS being supported by fast internal (real) memory formed from a byte addressable extent and a page addressable extent and a slower higher capacity backing store such as direct access storage devices (DASDs), comprising the steps of:

(a) during the sort phase, reading subsets of record keys from the backing store into the byte addressable extent of the fully internal memory backed VS, arranging the record keys into ordered strings, and writing the ordered strings out into the page addressable extent of the internal memory backed portions of VS, each ordered string or element thereof being written into the byte or page addressable extents of the internal memory backed VS by VS address modification; and (b) during the merge phase, reading preselected elements of the sorted strings from the page addressable extent into the byte addressable extent of fully internal memory backed VS and performing a multiple-way merge operation on said read preselected string elements.

2. The method according to claim 1, wherein during the sort phase, the method includes creating and updating a table of the starting VS addresses of all ordered strings in said page addressable extent, and still further wherein, during the merge phase, the preselected elements used in the multiple-way merge are accessed according to the table address and a displacement therefrom.

3. The method according to claim 1, wherein during either the sort or merge phases, each subset is called into a byte addressable extent in VS space, said counterpart byte addressable extent in VS space having at least twice the address capacity of the subset, and further wherein the multiple-way merge is of the replacement selection type.

4. A new use for an LRU-managed virtual storage of a CPU in the sort string generation of m records, said CPU including internal (real) memory for storing programs and data, and means for accessing the real memory for executing sort and management operations, said internal memory being formed from a byte addressable extent and a page addressable extent, said real memory and accessing means being managed as virtual storage (VS), said sort string generation being manifest as a nested ordering of keys of the records, comprising the steps of:

(a) during a first pass, calling one of m/s subsets of s keys (s<<m) of the records from an extrinsic source into the byte addressable extent of VS fully backed by internal (real) memory, and arranging the called subset into a partial nested ordering thereof, moving the nested ordering to the page addressable extent of VS by VS address modification, and updating a table with the VS address of the nested ordering in said page addressable extent, step (a) being repeated until the m/s subsets are exhausted, said VS including said other portion being selectively backed by internal (real) memory; and (b) during a second pass, executing a t-way replacement selection merge (t<s) in the byte addressable extent of VS selectively backed by internal (real) memory from among at least one key selected from each of t partial nested orderings of the subsets resident in the page addressable extent of VS according to their table VS addresses until the m/s such orderings become exhausted.

5. The method according to either claim 1 or 4, wherein the ratio of internal (real) memory backing to VS lies in the range substantially between 30% to 80%.

* * * * *